US011020680B2

(12) United States Patent
McCart-Pollak

(10) Patent No.: US 11,020,680 B2
(45) Date of Patent: Jun. 1, 2021

(54) SYSTEM AND METHOD FOR PROVIDING A TOY OPERABLE FOR RECEIVING AND SELECTIVELY VOCALIZING VARIOUS ELECTRONIC COMMUNICATIONS FROM AUTHORIZED PARTIES, AND FOR PROVIDING A CONFIGURABLE PLATFORM INDEPENDENT INTERACTIVE INFRASTRUCTURE FOR FACILITATING OPTIMAL UTILIZATION THEREOF

(71) Applicant: Shana Lee McCart-Pollak, Henderson, NV (US)

(72) Inventor: Shana Lee McCart-Pollak, Henderson, NV (US)

(*) Notice: Subject to any disclaimer, the term of this patent is extended or adjusted under 35 U.S.C. 154(b) by 0 days.

(21) Appl. No.: 13/678,458

(22) Filed: Nov. 15, 2012

(65) Prior Publication Data

US 2018/0117484 A1 May 3, 2018

(51) Int. Cl.
*A63H 3/00* (2006.01)
*A63H 30/04* (2006.01)
(Continued)

(52) U.S. Cl.
CPC ............. *A63H 30/04* (2013.01); *A63H 3/003* (2013.01); *A63H 3/28* (2013.01); *A63H 5/00* (2013.01);
(Continued)

(58) Field of Classification Search
CPC ............................... H04M 1/7253; G06F 3/16
See application file for complete search history.

(56) References Cited

U.S. PATENT DOCUMENTS

2002/0000062 A1\* 1/2002 Smirnov .................. A63H 3/28
 44/397
2004/0077272 A1 4/2004 Jurmain et al.
(Continued)

FOREIGN PATENT DOCUMENTS

KR 20030030603 A \* 4/2003

OTHER PUBLICATIONS

Machine Translation of KR 2003-0030603, The method for transmission a voice information to the toy using mobile radio communications system, Apr. 18, 2018, Korean Intellectual Property Office Website, Pates 1-12.\*

*Primary Examiner* — Jay Trent Liddle
*Assistant Examiner* — Alex P Rada, II
(74) *Attorney, Agent, or Firm* — Holland & Hart LLP

(57) ABSTRACT

The present invention is directed to a toy, and methodologies and infrastructures for provision, operation, and utilization thereof, implementable in any configuration (plush, stuffed, doll, character, vehicle, etc.) that is operable to: (a) receive an electronic message (optionally inclusive of media and/or interactive content) from an authorized party, (b) provide at least one visual (and/or audio) indicator to a recipient (e.g., a child) that a message is present (e.g., a toy element or region may light up, flash, emit an audio signal), and (c) vocalize the electronic message to the recipient in response to at least one of: (1) one or more specific actions of the recipient (e.g., moving the toy, picking it up, touching the active indicator, a verbal utterance, etc.), and/or (2) detection of proximal presence of a recipient ready for receipt thereof. The inventive toy and related data processing infrastructures may comprise many additional capabilities and functions.

19 Claims, 9 Drawing Sheets

(Exemplary Implementation Embodiments)

(51) Int. Cl.
*A63H 3/28* (2006.01)
*A63H 5/00* (2006.01)
*A63H 17/26* (2006.01)
*A63H 33/26* (2006.01)
*G06F 3/16* (2006.01)

(52) U.S. Cl.
CPC ............ *A63H 17/26* (2013.01); *A63H 33/26* (2013.01); *G06F 3/16* (2013.01); *A63H 2200/00* (2013.01)

(56) References Cited

U.S. PATENT DOCUMENTS

| | | | |
|---|---|---|---|
| 2006/0095262 A1 | 5/2006 | Danieli | |
| 2006/0154560 A1* | 7/2006 | Ahmed | A63H 3/28 446/297 |
| 2006/0234602 A1* | 10/2006 | Palmquist | A63H 3/003 446/297 |
| 2007/0127704 A1* | 6/2007 | Marti | H04M 1/2473 379/373.01 |
| 2007/0128979 A1* | 6/2007 | Shackelford | A63H 3/001 446/484 |
| 2011/0053129 A1* | 3/2011 | Basson | G09B 19/00 434/238 |
| 2012/0295510 A1* | 11/2012 | Boeckle | A63H 3/28 446/72 |

* cited by examiner

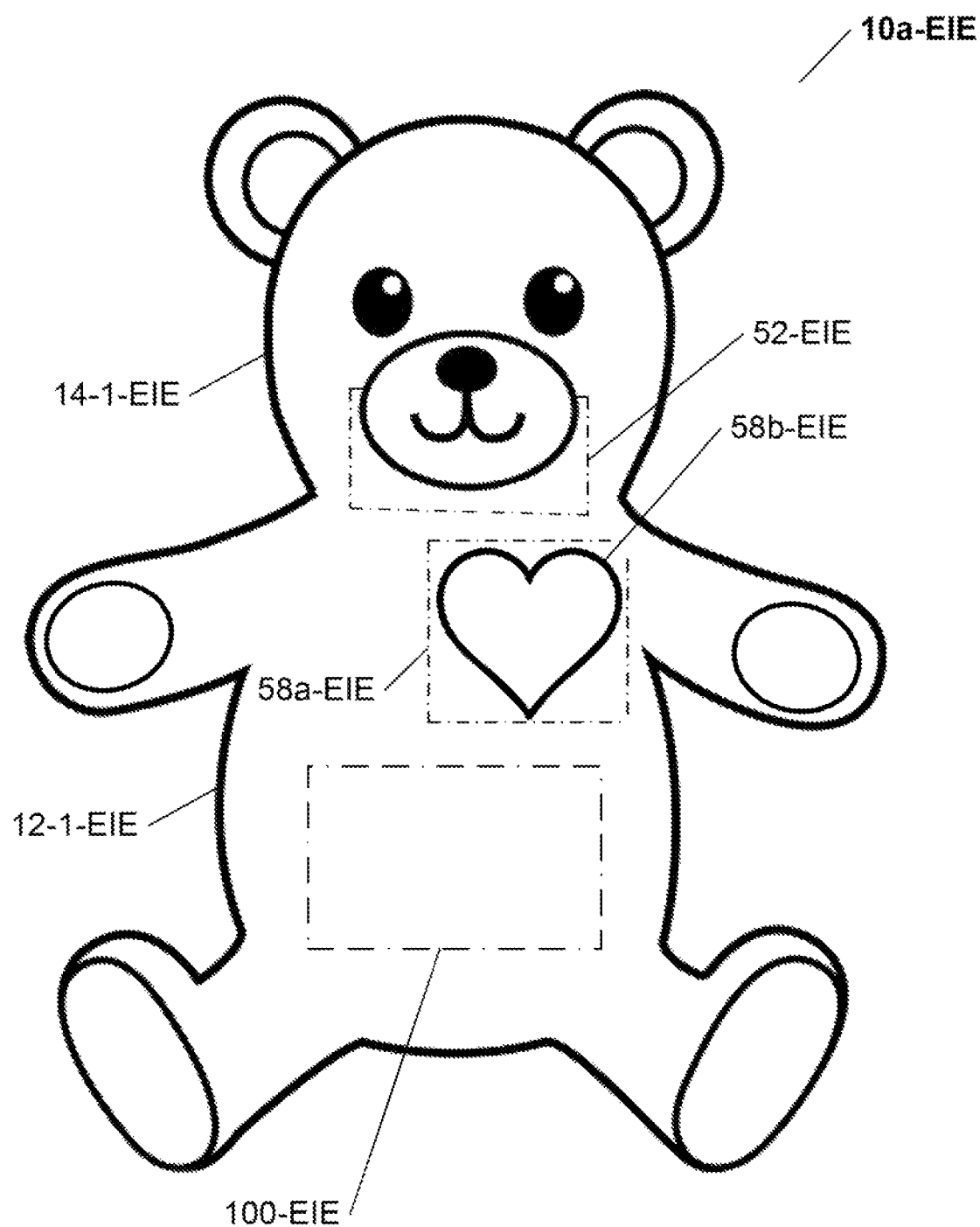
FIG. 1A-EIE
(Exemplary Implementation Embodiment)

(Exemplary Implementation Embodiments)

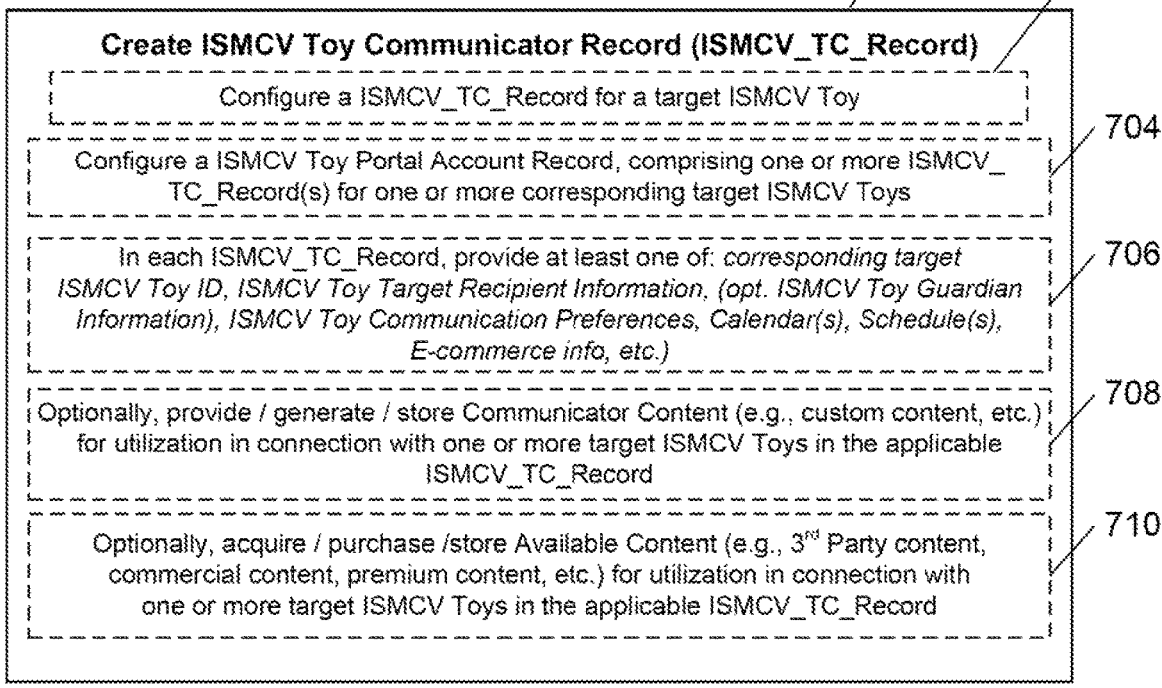
FIG. 7A (Exemplary)
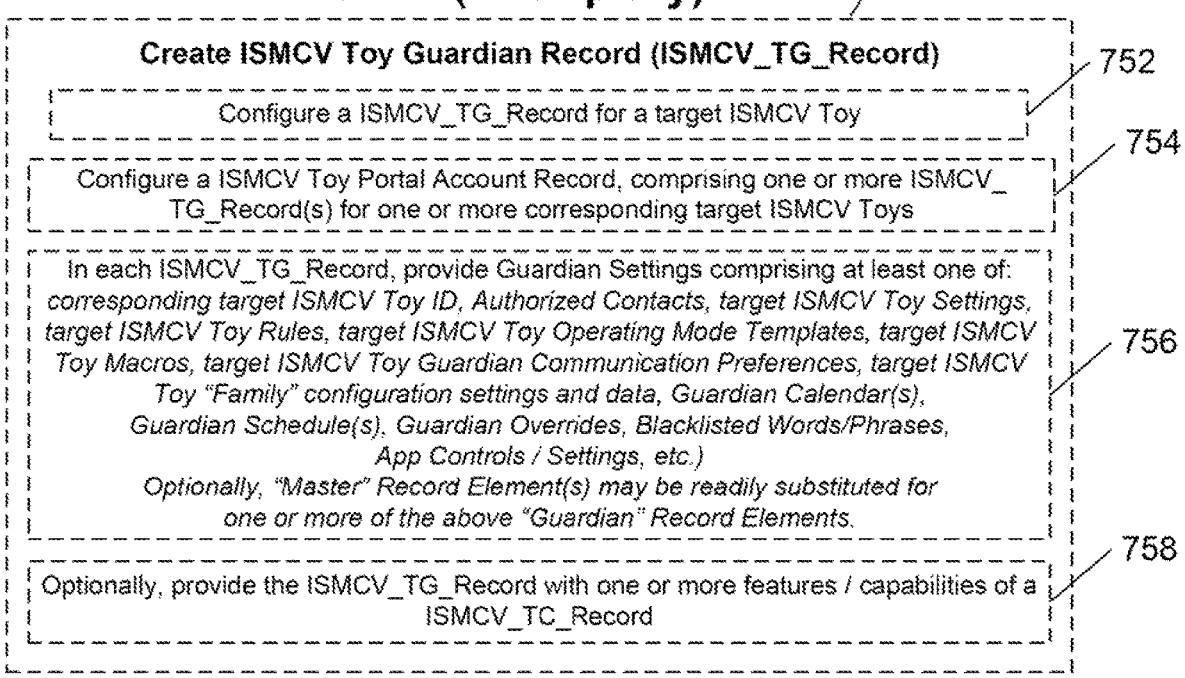
FIG. 7B (Exemplary)

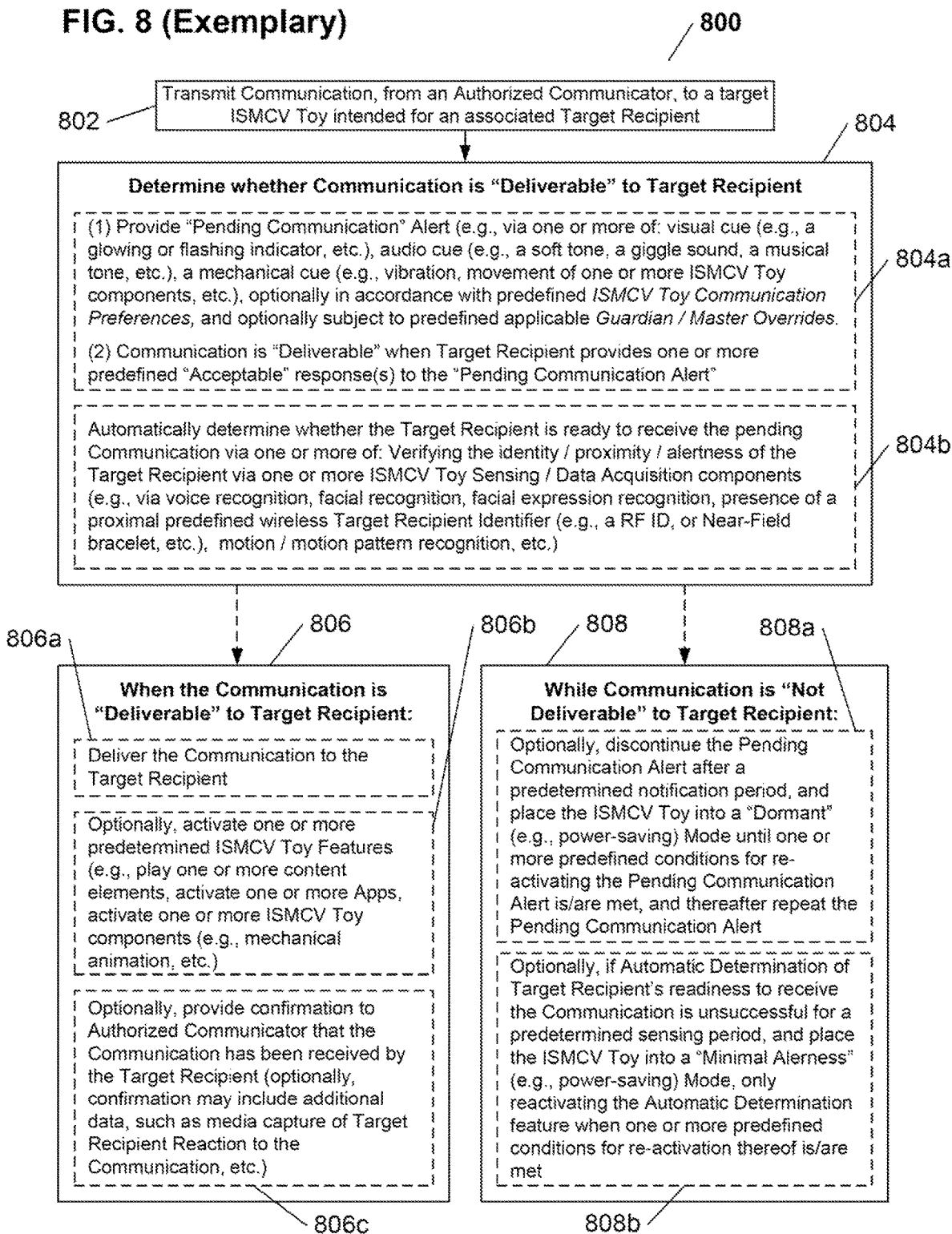
FIG. 8 (Exemplary)

US 11,020,680 B2

SYSTEM AND METHOD FOR PROVIDING A TOY OPERABLE FOR RECEIVING AND SELECTIVELY VOCALIZING VARIOUS ELECTRONIC COMMUNICATIONS FROM AUTHORIZED PARTIES, AND FOR PROVIDING A CONFIGURABLE PLATFORM INDEPENDENT INTERACTIVE INFRASTRUCTURE FOR FACILITATING OPTIMAL UTILIZATION THEREOF

FIELD OF THE INVENTION

The present invention relates generally to interactive devices (e.g., toys) capable of wireless electronic communication, and, and more particularly to: (1) systems and methods for providing a toy (or another apparatus) capable of receiving and selectively vocalizing, in accordance with configurable predefined criteria, various electronic communications (such as messages and/or other content) from one or more pre-authorized parties, for providing various embodiments of a configurable platform independent interactive infrastructure for facilitating optimal utilization thereof.

SUMMARY OF THE INVENTION

The system and method of the present invention, in various embodiments thereof, provide a toy (or equivalent portable product), implementable in any configuration (plush, stuffed, doll, character, vehicle, etc.), that is operable to: (a) receive an electronic message (optionally inclusive of media and/or interactive content) from an authorized party, (b) provide at least one visual (and/or audio) indicator to a recipient (e.g., a Target Recipient) that a message is present (e.g., a toy element or region may light up, flash, emit an audio signal), and (c) vocalize the electronic message to the recipient in response to at least one of: (1) one or more specific actions of the recipient (e.g., moving the toy, picking it up, touching the active indicator, a verbal utterance, etc.), and/or (2) detection of proximal presence of a recipient ready for receipt thereof (hereinafter referred to as "Interactive Selective Message/Communication Vocalization Toy, or the "ISMCV Toy"). The inventive system and method further provide various embodiments of data processing methodologies and infrastructures for provision, operation, and utilization of the ISMCV Toy. In various exemplary embodiments thereof, the inventive ISMCV Toy, and corresponding novel data processing infrastructures, comprise many additional advantageous capabilities and functions.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote corresponding or similar elements throughout the various figures:

FIG. 1A-EIE shows an illustrative diagram of an alternate exemplary implementation embodiment of the ISMCV Toy of FIG. 1A, implemented, by way of example only, as a Teddy Bear ISMCV Toy;

FIGS. 7A-7B show illustrative block diagrams of exemplary processes, executable by at least one data processing system, that are operable to initially configure any of novel ISMCV Toys shown in FIGS. 1A-1D, and in FIG. 1A-EIE, respectively, to store the configuration settings in an applicable electronic record associated therewith, and to enable later adjustment and changes in the configuration settings; and FIG. 8 shows an illustrative process flow diagram of an exemplary process 800, executable by at least one data processing component of an ISMCV Toy (such as any of novel ISMCV Toys shown in FIGS. 1A-1D, and in FIG. 1A-EIE, respectively), that is operable to determine whether a Communication received by the ISMCV Toy from an Authorized Party is "Deliverable" to the Target Recipient, and then perform one set of operations when the process determines that the Communication is "Deliverable" to the Target Recipient, or perform another set of operations when the process determines that the Communication is "Not Deliverable" to the Target Recipient.

DETAILED DESCRIPTION OF THE INVENTION

Figure 1A:
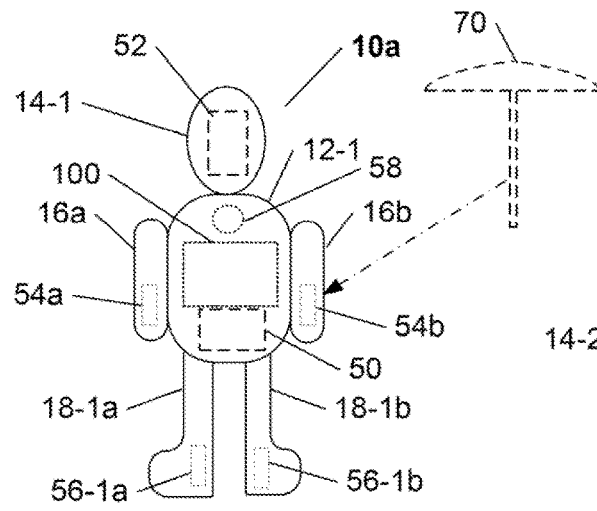
FIG. 1A shows an illustrative diagram of a first exemplary embodiment of the inventive system and method, in which the implemented as a humanoid (e.g., a doll, a robot, an action figure, etc.) or an anthropomorphic (teddy bear, etc.) toy.

The present invention, in various embodiments thereof, provides an ISMCV Toy (or equivalent portable product), implementable in any configuration (plush, stuffed, doll, character, vehicle, etc.), that is operable to:
- (a) receive an electronic communication (e.g., a message, and/or media and/or interactive content) from an authorized party,
- (b) provide at least one visual (and/or audio) indicator to a recipient (e.g., a target recipient) that a communication is present (e.g., an ISMCV Toy element or region may light up, flash, emit an audio signal), and
- (c) vocalize the electronic communication to the recipient in response to at least one of:
  - (1) one or more specific actions of the target recipient (e.g., moving the ISMCV Toy, picking it up, touching the active indicator, a verbal utterance, etc.), and/or
  - (2) detection of proximal presence of a target recipient ready for receipt thereto.

The system and method of the present invention further provide various embodiments of data processing methodologies and infrastructures for provision, operation, and utilization of the ISMCV Toy, and for providing many additional advantageous capabilities and functions thereto.

Before describing the various embodiments and features of the present invention, it should be noted that the inventive ISMCV device is referred to herein as a "Toy" for the sake of convenience and simplicity only—an ISMCV device, in accordance with a present invention, may be readily implemented as any aesthetic and/or abstract or functional object, that is not necessarily a toy, as a matter of design choice or convenience without departing from the spirit of the present invention. It should also be noted that the term "Target Recipient", as is used herein, refers to the intended user and beneficiary of the inventive ISMCV Toy (i.e., the intended recipient of the communications (e.g., messages, and/or content, etc.) received by the ISMCV Toy. For example, in various embodiments of the present invention, a Target Recipient is the child to whom the ISMCV Toy had been given.

In various alternate exemplary embodiments, implementations, and components of the inventive system and method, shown in FIGS. 1A to 8, and described in greater detail in the accompanying descriptions below, may optionally include one or more of the following advantageous aspects and/or features:
- (1) An ISMCV Toy in any configuration (plush, stuffed, doll, character, abstract, mobile, etc.) that is operable to: receive an electronic message (in a specific or multiple formats);
- (2) ISMCV Toys may be platform-independent and may be operable to receive one or more formats of digital communication, such as SMS messages (via cell or Wi-Fi or Bluetooth), Instant messages, email, etc.;
- (3) ISMCV Toys may be operable to receive messages from a website or a mobile phone app;
- (4) ISMCV Toys may be operable to receive voice phone messages (e.g. via Skype or Google Voice);
- (5) ISMCV Toys may be provide a visual (and/or audio) indicator to a Target Recipient that a message is present (e.g., an ISMCV Toy element or region may light up, flash, etc. with or without a soft tone);
- (6) ISMCV Toys may be operable to read/vocalize the electronic message to the Target Recipient;
- (7) ISMCV Toys may be configured such that vocalization of the electronic message is only in response to one or more specific predefined actions of the Target Recipient (e.g., moving the ISMCV Toy, picking up the ISMCV Toy, touching the active indicator, a verbal expression from the Target Recipient, etc.);
- (8) ISMCV Toys may be configured to be capable of automatically determining whether the Target Recipient is ready to receive a pending communication by verifying the identity/proximity/alertness of the Target Recipient via one or more of the following ISMCV Toy sensing/data acquisition components:
  - a) Target Recipient voice recognition,
  - b) Target Recipient facial recognition (and/or facial expression recognition),
  - c) Detection of presence of a proximal predefined wireless Target Recipient Identifier (e.g., a RF ID, or Near-Field bracelet worn by the Target Recipient, etc.),
  - d) Target Recipient motion/motion pattern recognition, etc.
- (9) ISMCV Toys may include trainable/recording-based audio filters to ensure that vocal playback of messages approximates the particular voice of the corresponding predefined sender (for non-voice text or email messages);
- (10) ISMCV Toys may be supported with a back-end infrastructure such as a web-portal for users of the ISMCV Toy to enable them to send messages to one or more ISMCV Toys linked to their accounts from the website, such that the ISMCV Toy(s) can receive such web-based messages via an active Wi-Fi connection;
- (11) ISMCV Toys may be operable to provide return confirmation of message playback;
- (12) ISMCV Toys may be operable to provide audio/video capture recording of the Target Recipient (e.g., Target Recipient) for a predetermined period of time following the Target Recipient's triggering of message playback;
- (13) ISMCV Toys may be operable to provide Social Media Integration to enable an ISMCV Toy/device to playback social media messages (instant messages, postings) and exchange messages (e.g. speech to text);
- (14) ISMCV Toys may be operable to play back downloaded content (Books, music, etc.);
- (15) ISMCV Toys may be branded and configured to play back messages in a premium character voice (e.g., a Disney, Nickelodeon, Cartoon Network, or equivalent character);
- (16) ISMCV Toys may be configured to restrict receipt of messages only from specific pre-authorized sources;
- (17) In alternate embodiments of the inventive system and method, the inventive device does not have to be an ISMCV Toy but may be any aesthetic and/or abstract or functional object (and the user does not need to be a Target Recipient);

(18) An ISMCV Toy back-end infrastructure may provide a message-sending platform (web, tablet, mobile app) that provides pre-addressed "Send Message to" controls (e.g., with recipient (e.g., Target Recipient) name pic) linked to that recipient's unique ISMCV Toy, with the capability to configure such controls for multiple ISMCV Toys;

(19) ISMCV Toys may be operable to provide timed message received notification with audio/visual indicator that goes dormant if Target Recipient does not activate the message access control (i.e. pickup the ISMCV Toy+ touch activating element), BUT that reactivates when the ISMCV Toy is disturbed or picked up, enabling message retrieval at a later time, and ENSURING that the message is actually received;

(20) ISMCV Toys may be operable to provide the ability to pre-schedule messages.

For example someone deployed being in the field for the next week, they can que the ISMCV Toy to send messages on certain days and times;

(21) ISMCV Toys may be operable to provide the ability to recognize text abbreviations like LOL and have an ISMCV Toy actually Laugh out loud instead of saying "lawl";

(22) ISMCV Toys may be operable to provide the ability to pre-schedule active and dormant periods for the ISMCV Toy (for example to suppress its operation during a Target Recipient's daily "nap time");

(23) ISMCV Toys may be operable to provide the ability to be automatically activated in connection with pre-configured calendar events and perform predefined actions during such scheduled activations—e.g., singing Happy Birthday on someone's Birthday, deliver Holiday greetings, etc.;

(24) The ISMCV Toy back-end infrastructure may be operable to provide functionality that enables user-generated or purchased content to be sent to the ISMCV Toy along with a message. Additional ISMCV Toy back-end infrastructure functionality for Feature (23), above, may be operable to:
  a) enable recipient Target Recipient to access the sent content through a variety of ways (verbal cue in response to a question from the ISMCV Toy, interaction with a primary interface (e.g., the ISMCV Toy heart), or through other physical interfaces (hugging the toy, squeezing the ISMCV Toy's paw, etc.),
  b) enable purchase of special content optionally linked to other digital or physical content (e.g., an abridged version of a storybook, a chapter from a storybook, etc. associated with the physical book or a cartoon based on that book, or a song associated with an album). The link may be a promotional link for marketing (e.g., get a free story for your Target Recipient's ISMCV Toy from the new storybooks), or a commercial one (buy the song for your ISMCV Toy and get a discount on the purchase of a full album), and
  c) enable authorized users to record their own content, like reading a story, singing a lullaby, and to enable storing of such user-generated content in user account for later sending to an ISMCV Toy on an ad-hoc or scheduled basis;

(25) The ISMCV Toy back-end infrastructure may comprise an online portal (e.g. a branded portal) to enable acquisition and purchase of content for the ISMCV Toys;

(26) ISMCV Toys may be configured with features and components that enable a desired degree of mechanical animation (blinking eyes, moving mouth, etc.) as a notification of a pending message, of available content, and/or as an additional action during message/content delivery (e.g., the ISMCV Toy moving its mouth when reading a story);

(27) ISMCV Toys may be configured with features and components to enable the ISMCV Toy to support use of external Target Recipient-safe headphones which may actually be configured to match/complement the ISMCV Toy in one or more ways (i.e. furry ear headphones for a teddy bear ISMCV Toy);

(28) ISMCV Toys may be configured to include built-in features or downloadable apps, that can cover any currently available or future applications/interactive functions that may be advantageously implemented in an electronic device with ISMCV Toy capabilities (for example playback of audio books, playing music, reciting nursery rhymes, engaging in interactive school lessons and related educational activities, etc.). Some additional examples of possible novel ISMCV Toy features may include, but are not limited to:
  a) activation of a control on the ISMCV Toy (i.e. squeezing paw or otherwise physically interacting therewith in a predetermined manner), and the ISMCV Toy will repeat any phrase spoken to it in its pre-configured voice (or in one of several pre-configured voices (preferably subject to a language filter (as in feature (29), and
  b) provision of the ISMCV Toy with a calendar and enable programming of various events therein (such as the Target Recipient's name and birth date), so it can let the Target Recipient know certain facts each day, like how old he on that day, what happened on that calendar date, naming a famous person born on that date, (Fun facts about the day), playing back a special message, or any other predefined recording;

(29) ISMCV Toys may be operable to provide a language filter feature that prevents the ISMCV Toy from verbalizing "blacklisted words" (such as swear words);

(30) ISMCV Toys may be configured with any type of a power supply as a matter of design choice without departing from the spirit of the invention. So the power supply can range from conventional replaceable batteries, replaceable and/or integrated rechargeable batteries, or equivalent rechargeable power supplies;

(31) ISMCV Toys that are provided with a rechargeable power supply may include any of a number of recharge components enabling replenishment of electrical power by one or more of the following electrical power charging means (implemented individually or in combination of two or more thereof): conventional DC jack or USB port or equivalent, with a connected external power supply recharging, base-station style recharging (where the ISMCV Toy comprises electrical contacts configured to electrically connect to corresponding contacts on the base station to enable charging (optionally the base station may be implemented as a toy component in itself, such as a toy stable for a "Pony" ISMCV Toy, so the Target Recipient may be instructed to place the ISMCV Toy in its "Sleeping Place" to "rest", and "near field" proximity recharging (i.e., by inductive means when an appropriately configured ISMCV Toy is placed in sufficient proximity with a "near field" charging component connected to another power supply);

(32) ISMCV Toys may also be provided with one or more supplemental power recharge components (that optionally may serve as primary recharge sources), such as: (a) solar panel element(s) (e.g., flexible solar panels implemented as an ISMCV Toy accessory (e.g., a hat, an umbrella, etc.), and/or (b) motion-driven recharge components (such as inductive motion-based rechargers that generate electrical power from motion of the ISMCV Toy and provide the charge to the ISMCV Toy's rechargeable power supply;

(33) ISMCV Toys may be provided with the capabilities for interacting with one another after a predefined "association procedure", such as pairing through proximity or physical contact, and/or via registration of an association on a ISMCV Toys Internet portals. For example, such "associated" LOL buddies may take advantage of a specific set of predefined "BFF" features, such as direct communication with one another, game play, and other interactive toy to toy activities, with and/or without human involvement. Alternately, a simplified version of this feature may be implemented where each ISMCV Toy may be configured to introduce itself (and/or its owner Target Recipient) to another ISMCV Toy that is brought within a predefined proximal distance;

(34) ISMCV Toys may also be provided with one or more pre-configured modes of operation that simultaneously govern and control multiple functions thereof, such as a "Baby Monitor Mode" or "Guard Mode", etc.;

(35) ISMCV Toys may be provided with one or more removable "accessories" that can activate one or more predefined associated functions, and/or that may add new features/functions thereto (such as a removable umbrella made of solar-panel material that is operable to re-charge the ISMCV Toy when exposed to sunlight.);

(36) ISMCV Toys may be provided with one or more separate companion "accessories" for children (such as a bracelet or a pendant that can (a) activate one or more predefined associated functions via entering or leaving a predefined proximity of the ISMCV Toy, and/or (b) that may work with one or more predefined "modes" of the ISMCV Toy (see feature 36) that may activate an alert if the ISMCV Toy is separated from being in proximity with the Target Recipient; and

(37) ISMCV Toys may be configured to operate in a specific foreign language, and/or may include the capability of translating phrase spoken thereto in one language to another. The translation feature may also be extended to any form of electronic communication capabilities of an ISMCV Toy, including, but not limited to, messaging, etc. For example, a text message may be sent to an ISMCV Toy in English, but, if a translation feature is configured for Spanish, the ISMCV Toy will speak the message in Spanish.

Referring now to FIGS. 1A-1D, several different exemplary embodiments of inventive ISMCV Toys are shown (that are in no way limited to the implementations shown, which are presented only by way of example).

Referring now to FIG. 1A, an illustrative diagram is shown of a first exemplary embodiment of the inventive system and method, in which the inventive ISMCV Toy is implemented as a humanoid (e.g., a doll, a robot, an action figure, etc.), or an anthropomorphic (teddy bear, etc.) ISMCV Toy 10*a*. An exemplary implementation of the ISMCV Toy 10*a* as a Teddy Bear is shown as the ISMCV Toy 10*a*-EIE in FIG. 1-EIE). The ISMCV Toy 10*a* may comprise at least a portion of the following elements:

12-1: Main Body Component (Torso)
14-1: Head
16*a*. 16*b*: Arms
18-1*a*. 18-1*b*: Legs

50: (Optional) Primary Electromechanical (or equivalent) System for providing mechanical/motion functionality to the ISMCV Toy 10*a* (e.g., animatronics, movement, etc.)

52: (Optional) Additional Functionality System for providing additional features to the ISMCV Toy 10*a* (such as Audio/Video capture, head/facial animatronics, etc.)

54-1*a*. 54-1*b*: (Optional) Arm Interaction Components for providing additional control/sensing features to the ISMCV Toy 10*a* (such as accessing various ISMCV Toy 10*a* functions by squeezing a predetermined 16*a*, 16*b* Arm area, etc.

56-1*a*. 56-1*b*: (Optional) Leg Interaction Components for providing additional control/sensing features to the ISMCV Toy 10*a* (such as accessing various ISMCV Toy 10*a* functions by squeezing a predetermined 18-1*a*, 18-1*b* Leg area, sensing when the ISMCV Toy 10*a* is placed on a particular surface, etc.)

58: Alert Component, for Providing a visual, and/or audio indication that the ISMCV Toy 10*a* has received a communication (e.g., a message, content, etc.) that is ready to be delivered to the subject (e.g., the Target Recipient), such as a "Pending Communication" Alert (See FIG. 8 on Drawings Page 9 for more detail)

70: (Optional) Removable Accessory for the ISMCV Toy 10*a* that may provide additional ISMCV functionality when connected to, or removed therefrom. (See Feature (36), above)

Figure 2:
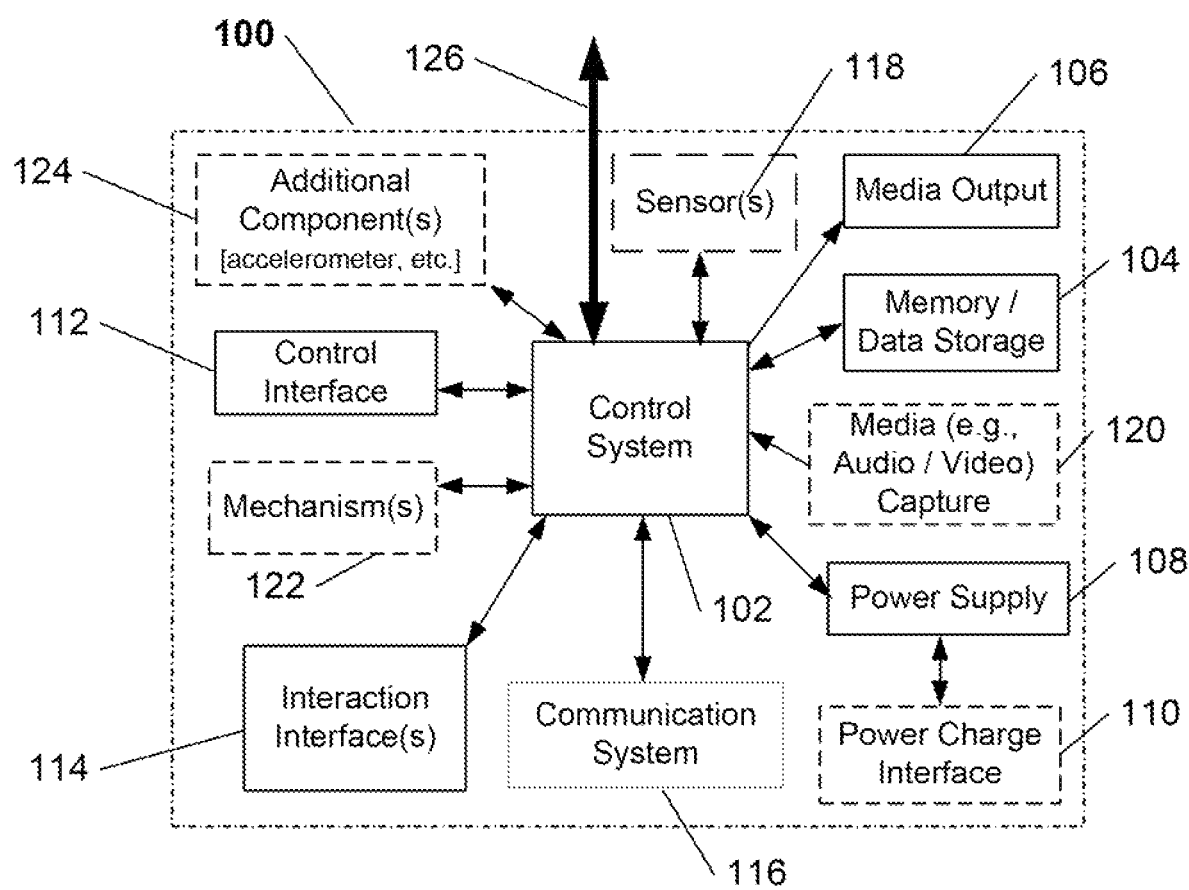
FIG. 2 shows an illustrative block diagram of an exemplary embodiment of a Core Management System for providing control, sensing, communication/content playback, and numerous other functions to an inventive ISMCV Toy, such as to the various embodiments of the ISMCV Toys shown in FIGS. 1A-1D, and in FIG. 1A-EIE, respectively.

100: Core Management System for providing Control, sensing, communication/content playback, and numerous other functions to the ISMCV Toy 10*a*. A detailed breakdown of an exemplary implementation of the Core Management System 100 is shown in FIG. 2

Referring now to FIG. 1A-EIE, an illustrative diagram is shown of an alternate exemplary implementation embodiment of the ISMCV Toy 10*a* of FIG. 1A, implemented as a Teddy Bear ISMCV Toy 10*a*-EIE. The ISMCV Toy 10*a*-EIE may comprise at least a portion of the following elements:

12-1-EIE: Main Body Component (Torso)
14-1-EIE: Head
52-EIE: Audio Component—includes sub-components for audio playback (e.g., speech, music, etc.), optional audio capture, etc.
58*a*-EIE: Alert Component, for providing a visual, and/or audio indication (e.g., through subcomponent 58*b*-EIE) that the ISMCV Toy 10*a*-EIE has received a communication (e.g., a message, content, etc.) that is ready to be delivered to the subject (e.g., the Target Recipient), such as a "Pending Communication" Alert (See FIG. 8 on Drawings Page 9 for more detail)
58*b*-EIE: Visual Alert Indicator sub-component of Alert Component 58*a*-EIE (shown as "heart-shaped" by way of example only), operable to provide a visual indication of "Pending Communication" Alert (See FIG. 8 on Drawings Page 9 for more detail), for example by lighting up (in a continual, and/or a flashing mode)
100-EIE: Core Management System for providing Control, sensing, communication/content playback, and numerous other functions to the ISMCV Toy 10*a*-EIE. A detailed breakdown of an exemplary implementation of the Core Management System 100 (which can readily serve as the Core Management System 100-EIE), is shown in FIG. 2

Figure 1B:
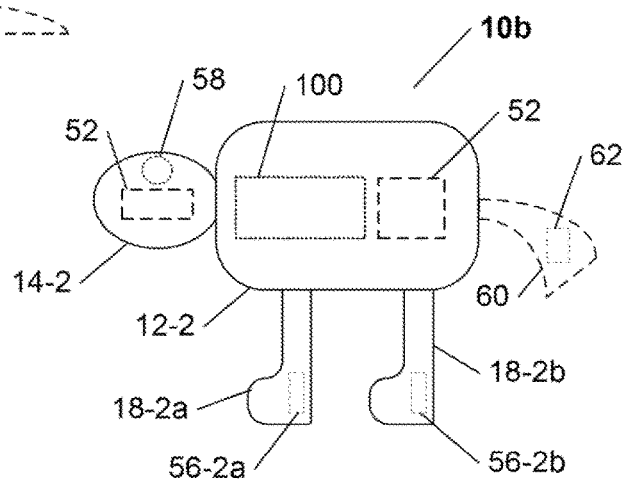
FIG. 1B shows an illustrative diagram of a second exemplary embodiment of the inventive system and method, in which the inventive ISMCV Toy is implemented as a quadruped toy (e.g., a pony, a wolf, etc.)

Referring now to FIG. 1B, an illustrative diagram is shown of a second exemplary embodiment of the inventive system and method, in which the inventive ISMCV Toy is implemented as a quadruped toy (e.g., a pony, a wolf, etc.)

ISMCV Toy 10b. The ISMCV Toy 10b may comprise at least a portion of the following elements:

12-2: Main Body Component (Torso)
14-2: Head
18-2a: Front Legs
18-2b: Rear Legs
50: (Optional) Primary Electromechanical (or equivalent) System for providing mechanical/motion functionality to the ISMCV Toy 10b (e.g., animatronics, movement, etc.)
52: (Optional) Additional Functionality System for providing additional features to the ISMCV Toy 10b (such as Audio/Video capture, head/facial animatronics, etc.)
56-2a. 56-2b: (Optional) Leg Interaction Components for providing additional control/sensing features to the ISMCV Toy 10b (such as accessing various ISMCV Toy 10b functions by squeezing a predetermined 18-2a, 18-2b Leg area, sensing when the ISMCV Toy 10b is placed on a particular surface, etc.)
58: Alert Component, for providing a visual, and/or audio indication that the ISMCV Toy 10b has received a communication (e.g., a message, content, etc.) that is ready to be delivered to the subject (e.g., the Target Recipient), such as a "Pending Communication" Alert (See FIG. 8 on Drawings Page 9 for more detail)
60: (Optional) Tail
62: (Optional) Tail Interaction Component for providing additional control/sensing features to the ISMCV Toy 10b (such as accessing various ISMCV Toy 10b functions by squeezing a predetermined Tail 60 area, tugging on the Tail 60)
100: Core Management System for providing Control, sensing, communication/content playback, and numerous other functions to the ISMCV Toy 10b. A detailed breakdown of an exemplary implementation of the Core Management System 100 is shown in FIG. 2

Figure 1C:
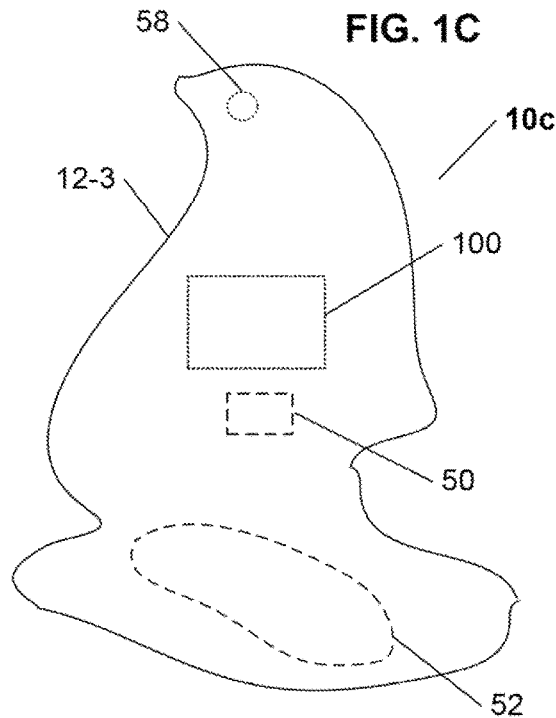
FIG. 1C shows an illustrative diagram of a third exemplary embodiment of the inventive system and method, in which the inventive ISMCV Toy is implemented as a unitary body (e.g., abstract) object or toy.

Referring now to FIG. 1C, an illustrative diagram is shown of a third exemplary embodiment of the inventive system and method, in which the inventive ISMCV Toy is implemented as a unitary body (e.g., abstract) object (or toy) ISMCV Toy 10c. The ISMCV Toy 10c may comprise at least a portion of the following elements:

12-3: Main Body Component (Torso)
50: (Optional) Primary Electromechanical (or equivalent) System for providing mechanical/motion functionality to the ISMCV Toy 10c (e.g., animatronics, movement, etc.)
52: (Optional) Additional Functionality System for Providing additional features to the ISMCV Toy 10c (such as movement over a surface, etc.)
100: Core Management System for providing Control, sensing, communication/content playback, and numerous other functions to the ISMCV Toy 10c. A detailed breakdown of an exemplary implementation of the Core Management System 100 is shown in FIG. 2

Figure 1D:
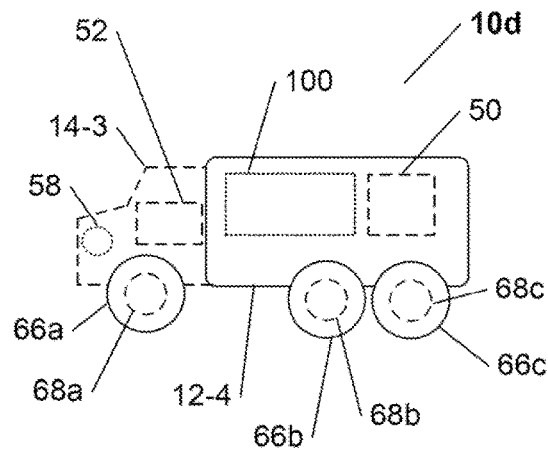
FIG. 1D shows an illustrative diagram of a fourth exemplary embodiment of the inventive system and method, in which the inventive ISMCV Toy is implemented as a vehicle (or equivalent) toy (e.g., a truck, a spaceship, an airplane)

Referring now to FIG. 1D, an illustrative diagram is shown of a fourth exemplary embodiment of the inventive system and method, in which the inventive ISMCV Toy is implemented as a vehicle (or equivalent) toy (e.g., a truck, a spaceship, an airplane) ISMCV Toy 10d. The ISMCV Toy 10d may comprise at least a portion of the following elements:

12-4: Main Body Component
14-3: Additional Body Component (e.g., Truck cabin)
66a-66c: Wheel Sets
50: (Optional) Primary Electromechanical (or equivalent) System for providing mechanical/motion functionality to the ISMCV Toy 10d (e.g., animatronics, flashing lights, movement, etc.)
52: (Optional) Additional Functionality System for providing additional features to the ISMCV Toy 10d (such as Audio/Video capture, Additional Body Component animatronics, etc.)
58: Alert Component, for providing a visual, and/or audio indication that the ISMCV Toy 10d has received a communication (e.g., a message, content, etc.) that is ready to be delivered to the subject (e.g., the Target Recipient), such as a "Pending Communication" Alert (See FIG. 8 on Drawings Page 9 for more detail)
68a-68c: (Optional) Wheel Interaction Components for providing additional control/sensing features to the ISMCV Toy 10d (such as accessing various ISMCV Toy 10d functions by rolling it (i.e. spinning the wheels), sensing when the ISMCV Toy 10d is rolling at a particular speed, and/or over a particular distance, etc.)
100: Core Management System for providing Control, sensing, communication/content playback, and numerous other functions to the ISMCV Toy 10d. A detailed breakdown of an exemplary implementation of the Core Management System 100 is shown in FIG. 2.

Referring now to FIG. 2, an illustrative block diagram is shown of an exemplary embodiment of the Core Management System 100 for providing control, sensing, communication/content playback, and numerous other functions to an inventive ISMCV Toy, such as to the various embodiments of the ISMCV Toys 10a-10d, and 10a-EIE, shown in FIGS. 1A-1D, and in FIG. 1A-EIE, respectively. The Core Management System 100 may comprise at least a portion of the following elements:

102-124: Self Explanatory in FIG. 2. Dashed Lines indicate optional components
126: Control/Communication/Power Link to additional components of the ISMCV Toy Referring now to FIGS. 3A-5, several different exemplary embodiments of inventive ISMCV Toy Deployment Infrastructures (that are in no way limited to the implementations shown, which are presented only by way of example), are illustrated, showing various possible solutions for consumer utilization of ISMCV Toys. Advantageously, the ISMCV Toy Deployment Infrastructures of FIGS. 3A-4 may be readily used in conjunction with any of the embodiments of the ISMCV Toys 10a-10d, and 10a-EIE, shown in FIGS. 1A-1D, and in FIG. 1A-EIE, respectively. FIG. 5 shows an exemplary embodiment of one of the core components of the core components of the ISMCV Toy Deployment Infrastructure embodiment of FIG. 4.

Figure 3A:
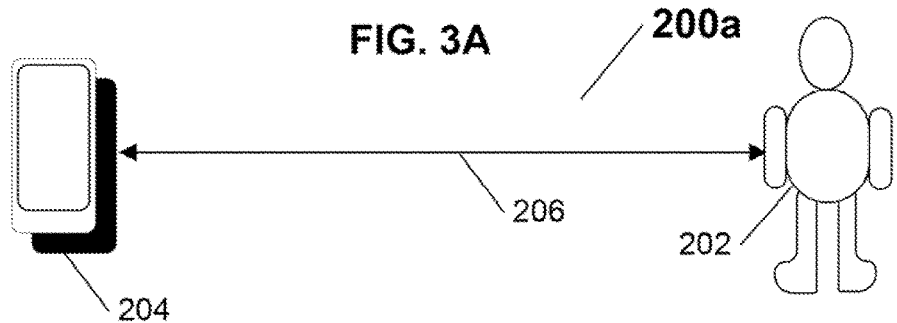
FIG. 3A shows an illustrative diagram of a first exemplary embodiment of the inventive ISMCV Toy Deployment Infrastructure, that provides the simplest solution for utilization of any of novel ISMCV Toys shown in FIGS. 1A-1D, and in FIG. 1A-EIE, respectively.

Referring now to FIG. 3A, an illustrative diagram is shown of a first exemplary embodiment of the inventive ISMCV Toy Deployment Infrastructure, shown as an ISMCV Toy Deployment Infrastructure 200a, that provides the simplest solution for ISMCV Toy utilization. The ISMCV Toy Deployment Infrastructure 200a may comprise at least a portion of the following elements:

202: An ISMCV Toy (may be of any type or configuration)
204: Mobile Communication Device (e.g., a smart phone, a PDA, a tablet computer, etc.)
206: Local Communication Link—may be selectively established between the Mobile Communication Device 204 and the ISMCV Toy 202 to enable communication therebetween (e.g., a short range wireless communication connection, such as Bluetooth, Wi-Fi, near-field, RF, IR, or any equivalent (e.g., proprietary) version thereof)

Figure 3B:
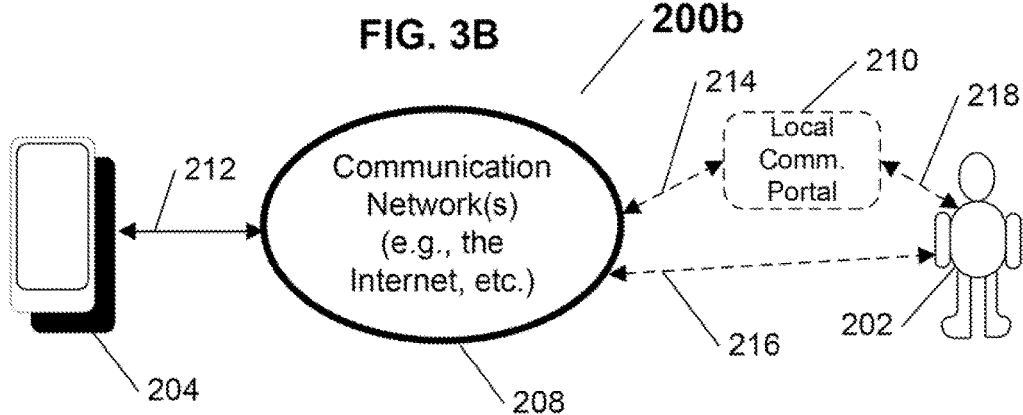
FIG. 3B shows an illustrative diagram of a second exemplary embodiment of the inventive ISMCV Toy Deployment Infrastructure that provides an additional solution for utilization of any of novel ISMCV Toys shown in FIGS. 1A-D, and in FIG. 1A-EIE, respectively.

Referring now to FIG. 3B, an illustrative diagram is shown of a second exemplary embodiment of the inventive ISMCV Toy Deployment Infrastructure, shown as an ISMCV Toy Deployment Infrastructure 200b, that provides an additional solution for ISMCV Toy utilization. The ISMCV Toy Deployment Infrastructure 200b may comprise at least a portion of the following elements:

- 202: An ISMCV Toy (may be of any type or configuration)
- 204: Mobile Communication Device (e.g., a smart phone, a PDA, a tablet computer, etc.)
- 208: Communication Network (e.g., the Internet)—enables remote and local communication between the Mobile Communication Device 204 and the ISMCV Toy 202.
- 210: (Optional) Local Communication Portal (e.g., a router and/or modem) that enables connectivity to the Communication Network 208
- 212: Mobile Communication Link (e.g., Wi-Fi, cellular network, or equivalent)—for enabling communication between the Mobile Communication Device 204 and the Communication Network 208
- 214-218: Communication Links (e.g., Bluetooth. Wi-Fi. and/or physical cable connection, etc.)—for enabling communication between the ISMCV Toy 202 and the Communication Network 208

Figure 3C:
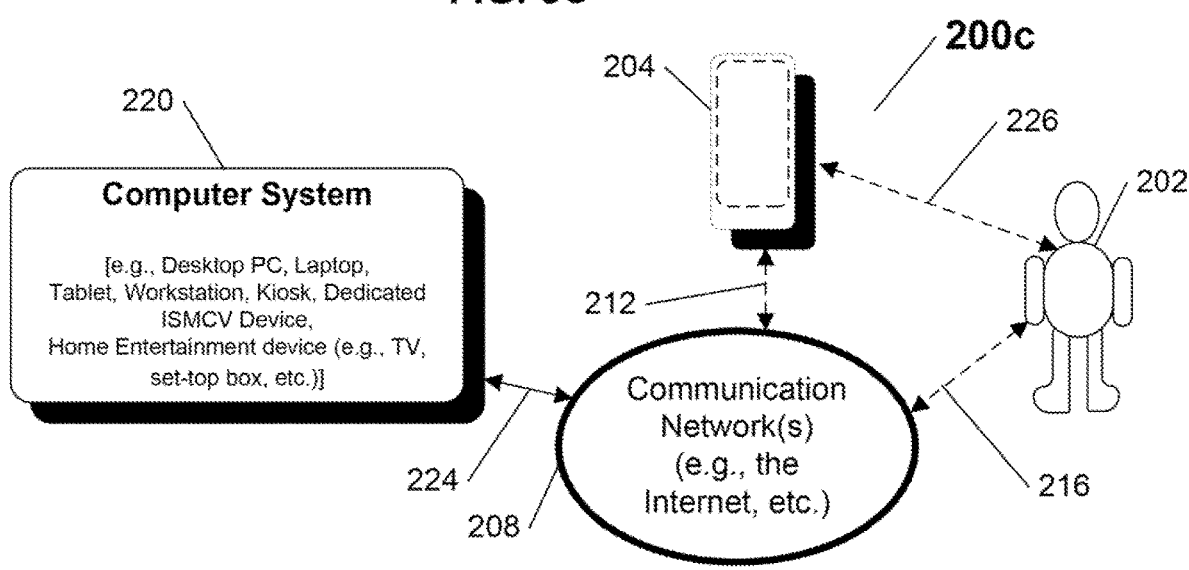
FIG. 3C shows an illustrative diagram of a third exemplary embodiment of the inventive ISMCV Toy Deployment Infrastructure that provides yet another additional solution for utilization of any of novel ISMCV Toys shown in FIGS. 1A-1D, and in FIG. 1A-EIE, respectively.

Referring now to FIG. 3C, an illustrative diagram is shown of a third exemplary embodiment of the inventive ISMCV Toy Deployment Infrastructure, shown as an ISMCV Toy Deployment Infrastructure 200c, that provides yet another additional solution for ISMCV Toy utilization. The ISMCV Toy Deployment Infrastructure 200c may comprise at least a portion of the following elements:

- 202: An ISMCV Toy (may be of any type or configuration)
- 204: (Optional) Mobile Communication Device (e.g., a smart phone, a PDA, a tablet computer, etc.)
- 208: Communication Network (e.g., the Internet)—enables remote and local communication between the Mobile Communication Device 204 and the ISMCV Toy 202
- 212: (Optional) Mobile Communication Link (e.g., Wi-Fi, cellular network, or equivalent)—for enabling communication between the optional Mobile Communication Device 204 and the Communication Network 208
- 216: Communication Links (e.g., Bluetooth, Wi-Fi, and/or Physical cable connection, etc.)—for enabling communication between the ISMCV Toy 202 and the Communication Network 208
- 220: Computer System (self explanatory in FIG. 3C)
- 224: Communication Link (e.g., physical cable, Wi-Fi, cellular network, or equivalent)—for enabling communication between the Computer System 220 and the Communication Network 208

Figure 4:
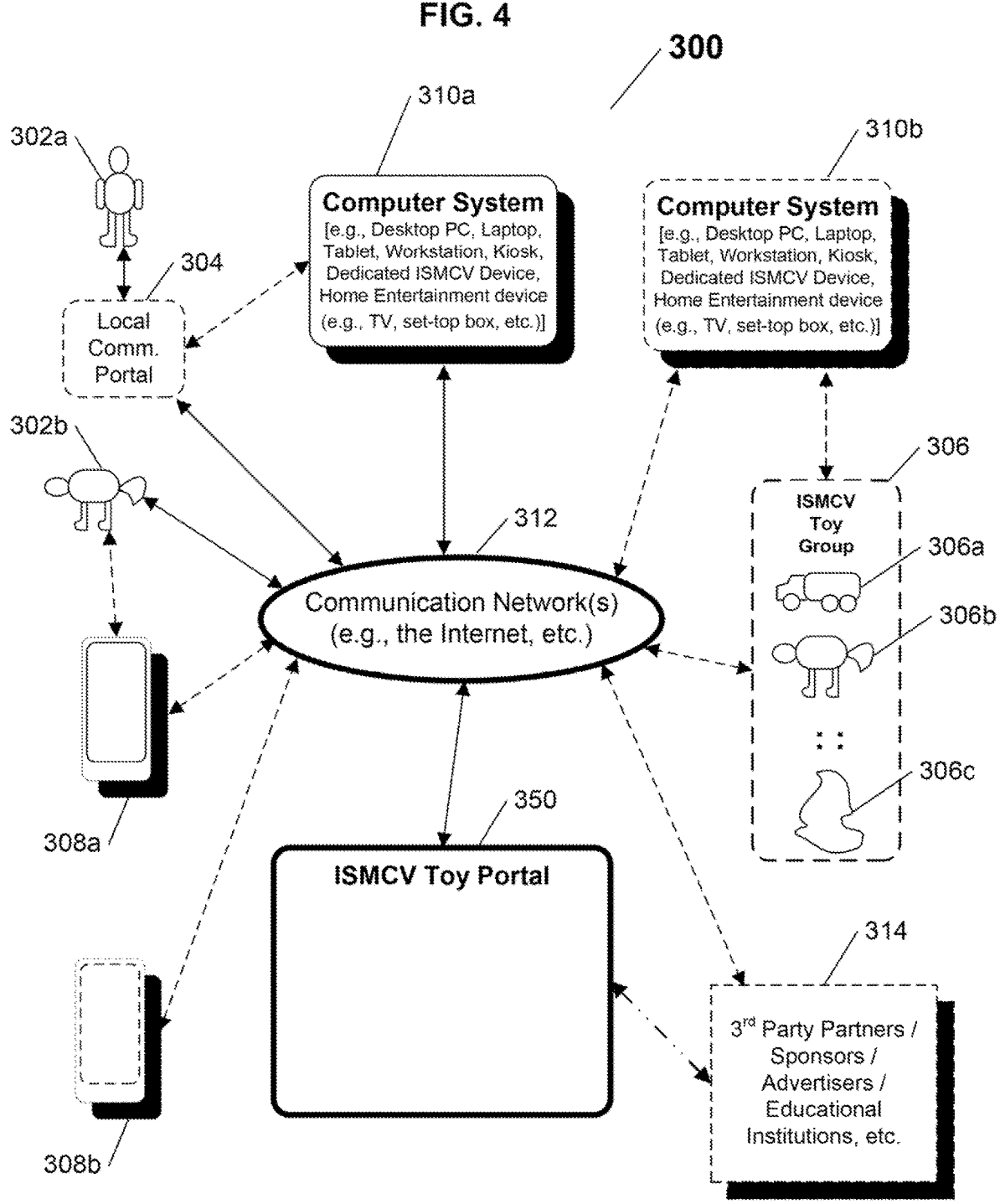
FIG. 4 shows an illustrative diagram of a fourth exemplary embodiment of the inventive ISMCV Toy Deployment Infrastructure, that provides a comprehensive solution for utilization and advantageous commercialization of plural ISMCV Toys (such as the novel ISMCV Toys shown in FIGS. A-D. and in FIG. 1A-EIE, respectively) in conjunction with one or more optional ISMCV Toy Support/Enhancement platforms.
Figure 5:
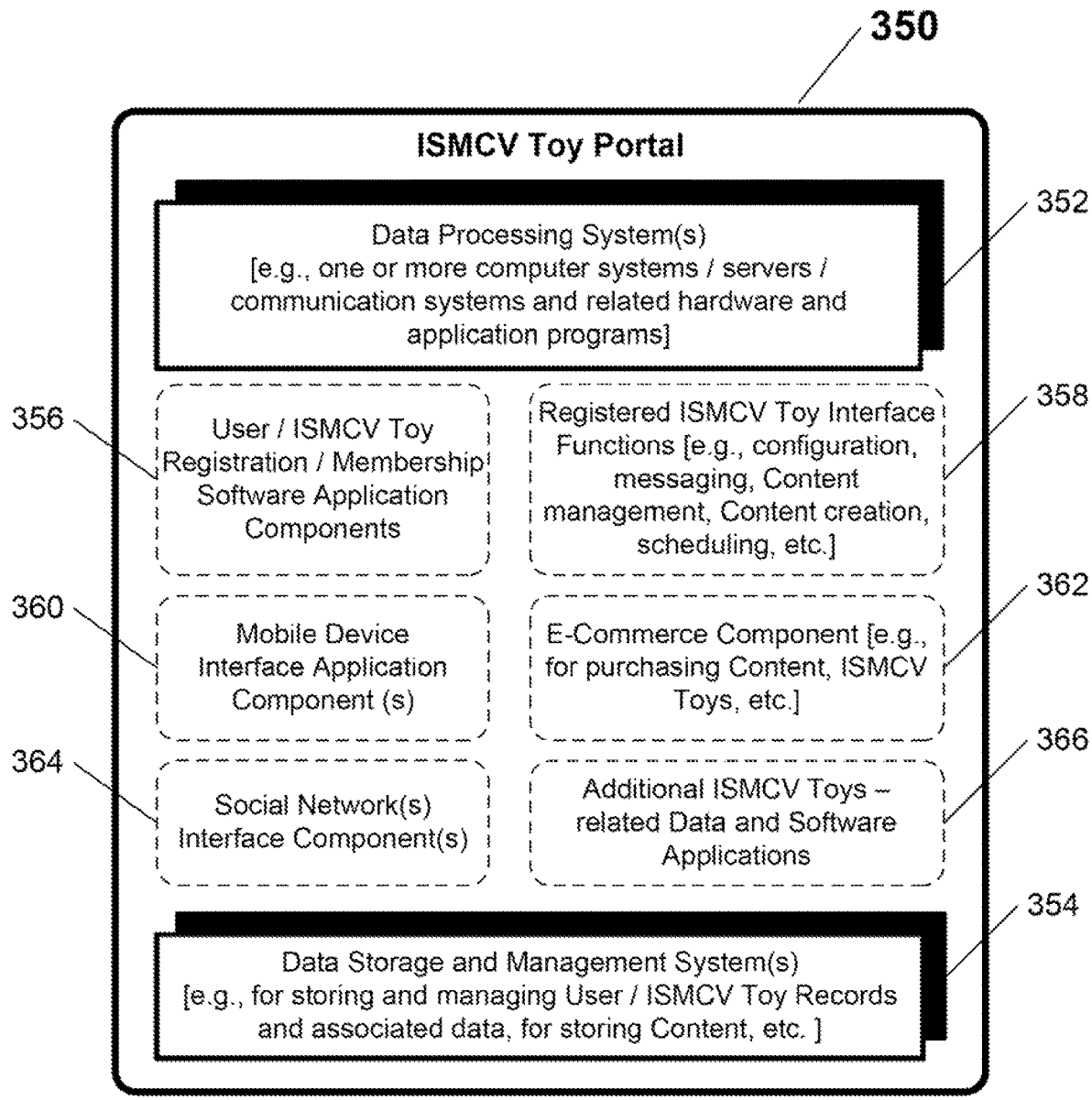
FIG. 5 shows an illustrative block diagram of an exemplary embodiment of an inventive ISMCV Toy Portal (e.g., an Internet website (or group of websites) of the inventive ISMCV Toy Deployment Infrastructure of FIG. 4, that is operable to advantageously provide additional functionality and features to various ISMCV Toy stakeholders.

Referring now to FIG. 4, an illustrative diagram is shown of a fourth exemplary embodiment of the inventive ISMCV Toy Deployment Infrastructure, shown as an ISMCV Toy Deployment Infrastructure 300, that provides a comprehensive solution for utilization and advantageous commercialization of plural ISMCV Toys in conjunction with one or more optional ISMCV Toy Support/Enhancement platforms. The quantities and types of various ISMCV Toys and Toy Groups illustrated in this FIG. 4, are shown by way of example only and are not intended as limitations in any way.

The ISMCV Toy Deployment Infrastructure 300 may comprise at least a portion of the following elements (Note: Components illustrated with dashed lines may be "Optional"):

- 302a. 302b: ISMCV Toys (may be of any type or configuration)
- 304: (Optional) Local Communication Portal (e.g., a router and/or modem) that enables connectivity of an ISMCV Toy to the Communication Network 312
- 306, 306a-306c: ISMCV Toy Group (e.g., a group of at least two ISMCV Toys 306a-306c, that have been configured to with one or more associations with one another or with their respective owners/users)
- 308a, 308b: Mobile Communication Device (e.g., a smart phone, a PDA, a tablet computer, etc.)
- 310a. 310b: Computer System (self explanatory in FIG. 4)
- 312: Communication Network (e.g., the Internet)—enables remote and local communication between the Mobile Communication Device 204 and the ISMCV Toy 202
- 314: (Optional) ISMCV Toy Partner Entities' Systems (self explanatory in FIG. 4)
- 350: ISMCV Toy Portal (e.g., an Internet website (or group of websites) operable to advantageously provide additional functionality and features (such as Toy configuration, improved communication solutions, content acquisition, etc.) to various ISMCV Toy stakeholders (e.g., the Toy users (e.g., a Target Recipient, their guardians), communicating parties (parents, other authorized relatives and friends, etc.)). A detailed breakdown of an exemplary implementation of the ISMCV Toy Portal 350 is shown in FIG. 5.

Figure 6:
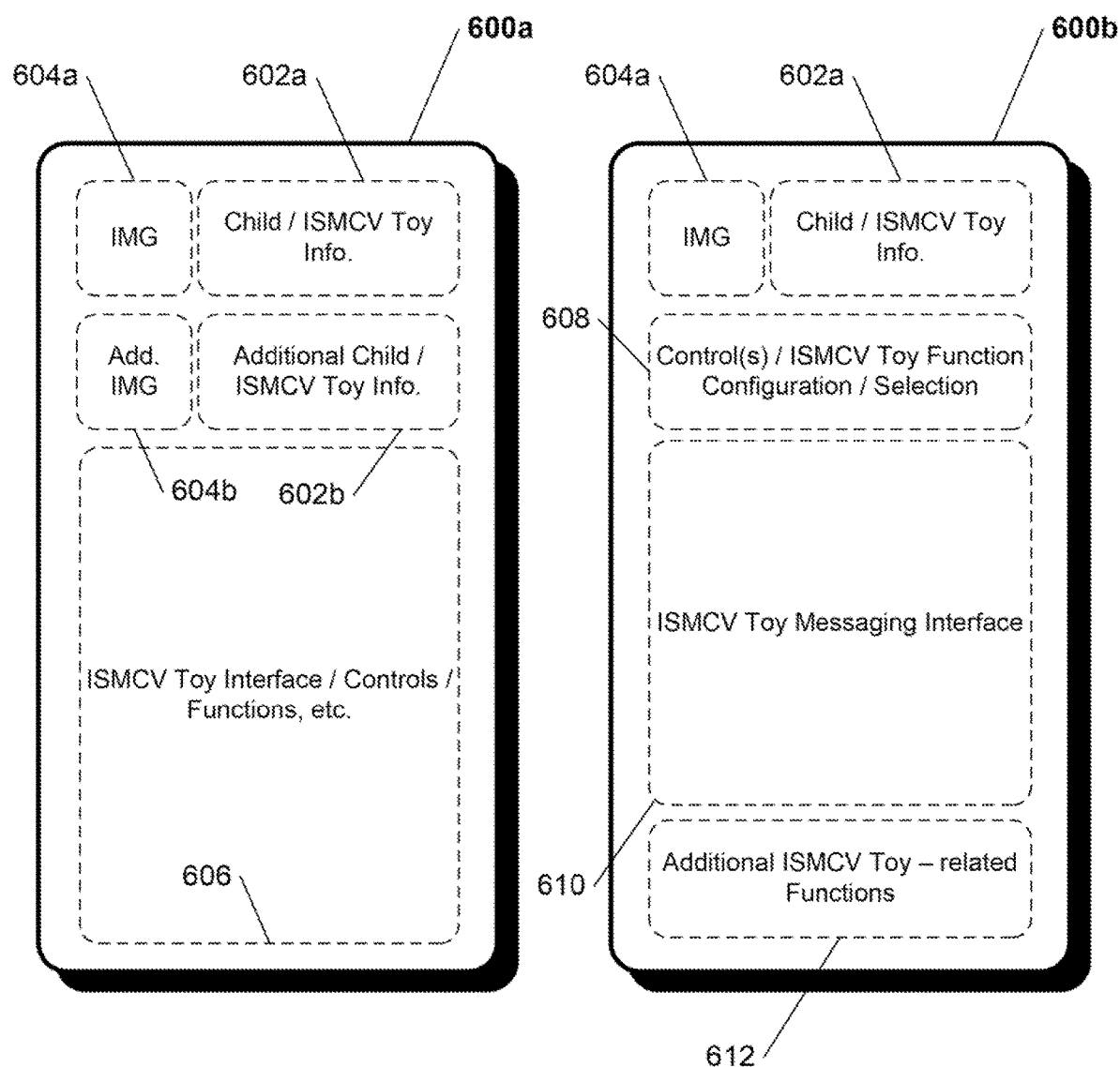
FIG. 6 shows illustrative diagrams of exemplary implementation embodiments of Communicating Party User Interfaces, that may be implemented in any of the Mobile Communication Devices and/or the Computer Systems of the various embodiments of the inventive ISMCV Toy Deployment Infrastructures of FIGS. 3A-3C, FIG. 4, respectively.

Referring now to FIG. 5, an illustrative block diagram is shown of an exemplary embodiment of the ISMCV Toy Portal 350 (e.g., an Internet website (or group of websites) operable to advantageously provide additional functionality and features to various ISMCV Toy stakeholders. The ISMCV Toy Portal 350 may be advantageously utilized with ISMCV Toys of any type or configuration, such as the various embodiments of the ISMCV Toys 10a-10d, and 10a-EIE of FIGS. 1A-1D, and FIG. 1A-EIE, respectively. The ISMCV Toy Portal 350 may comprise at least a portion of the following elements:

- 352-366: Self Explanatory in FIG. 5. Dashed Lines indicate optional components Referring now to FIG. 6, illustrative diagrams are shown of exemplary implementation embodiments of Communicating Party User interfaces 600a and 600b, that may be implemented in any of the Mobile Communication Devices 204, and 308a, 308b of FIGS. 3A-3C, and of FIG. 4, respectively, and that may also be implemented in any of the Computer Systems 220, and 310a, 310b of FIGS. 3A-3C, and of FIG. 4, respectively.

The Communicating Party User Interfaces 600a and 600b, may readily utilized by authorized parties to initiate and conduct permitted communications with one or more associated ISMCV Toys (which may be of any type or configuration, such as the various embodiments of the ISMCV Toys 10a-10d, and 10a-EIE of FIGS. 1A-1D, and FIG. 1A-EIE, respectively). Optionally, the Communicating Party User Interfaces 600a and 600b may comprise additional control elements/components, operable to enable authorized parties to access additional features related to ISMCV Toy configuration and/or utilization (for example such as providing the necessary controls for utilization of processes 700, and/or 750 of FIGS. 7A and 7B., respectively.

The Communicating Party User Interface 600a is optimized for utilization with multiple associated ISMCV Toys, while the Communicating Party User Interface 600b is optimized for utilization with a single associated ISMCV Toy.

The Communicating Party User Interfaces 600a and 600b may comprise at least a portion of the following elements:

602a-612: Self Explanatory in FIG. 6

NOTE: The sizes, the quantities, and the relative positions of the User Interface Elements 602a-612, are shown in FIG. 6 by way of example only and are not intended to serve as limitations in any way.

Referring now to FIGS. 7A-78 show illustrative block diagrams of exemplary processes 700, and 750, respectively, operable to initially configure an inventive ISMCV Toy, to store the configuration settings in an applicable electronic record associated therewith, and to enable later adjustment and changes in the configuration settings. The processes 700, 750 may also optionally enable additional operations relating to ISMCV Toy utilization, for example content generation, acquisition, and storage etc.

The process 700 is intended for use by the Authorized Party intending to communicate with, and otherwise provide benefits to, the Target Recipient, through the ISMCV Toy ("Communicator"), and enables creation and management of a ISMCV Communicator Record which may be stored on the Communicator's data processing system (e.g., their mobile device, etc.), and/or at the ISMCV Toy Portal.

The process 750 is intended for use by the party responsible for the Target Recipient (for example a parent, if a Target Recipient is a child) ("Guardian"), that may want to utilize additional ISMCV Toy features that are Guardian specific, such as setting "sleep" times for the ISMCV Toy or changing its settings in accordance with their household requirements/schedules, and enables creation and management of a ISMCV Guardianr Record which may be stored on the Guardian's data processing system (e.g., their mobile device, etc.), and/or at the ISMCV Toy Portal.

The processes 700, 750 may be executed by any applicable data processing system, such as, for example, by any of the Mobile Communication Devices 204, 308a, 308b and/or by any of the Computer Systems 220, 310a, 310b, of FIGS. 3A-3C, FIG. 4, and/or by any applicable components of the ISMCV Toy Portal 350 of FIG. 5. The processes 700, 750 may comprise at least a portion of the following elements:

700-758: Self Explanatory in FIGS. 7A, 7B

Referring now to FIG. 8, an illustrative process flow diagram is shown of an exemplary process 800, executed by a data processing component of an ISMCV Toy, that is operable to determine whether a Communication received by the ISMCV Toy from an Authorized Party is "Deliverable" to the Target Recipient, and then perform one set of operations when the process determines that the Communication is "Deliverable" to the Target Recipient, or preform another set of operations when the process determines that the Communication is "Not Deliverable" to the Target Recipient.

The process 800 may be implemented in, and executed by, various subcomponents of an ISMCV Toy Core Management System, such as the Core Management System 100 of FIG. 2. The process 800 may comprise at least a portion of the following elements:

802-808b: Self Explanatory in FIGS. 7A. 7B

Thus, while the have been shown and described and pointed out fundamental novel features of the inventive system and method as applied to preferred embodiments thereof, it will be understood that various omissions and substitutions and changes in the form and details of the devices and methods illustrated, and in their operation, may be made by those skilled in the art without departing from the spirit of the invention.

I claim:

1. A portable interactive toy, comprising:
a body;
a wireless communication system coupled with the body;
a data processing system coupled with the body and in communication with the wireless communication system, wherein the data processing system is configured to operate the interactive toy and:
perform a first set of operations when a received electronic communication is determined to be deliverable to a user of the interactive toy, wherein the first set of operations comprises initiating playback of the electronic communication to the user in response to at least one of one or more specific actions of the user, wherein the first set of operations comprises delaying playback of the received electronic communication until after expiry of a pre-scheduled dormant period during which the toy is restricted from engaging the user; and
perform a second set of operations when a received electronic communication is determined to be undeliverable to the user of the interactive toy;
memory coupled with the body and in communication with the data processing system, wherein the memory includes one or more programmable calendars;
a plurality of media components coupled with the body and in communication with the data processing system, the media components configured to receive inputs from the user and output content received by the wireless communication system and voice messages associated with the one or more programmable calendars; and
a power supply operable to supply electrical power to one or more of the data processing component, the memory, the wireless communication system, and the plurality of media components.

2. The portable interactive toy of claim 1, wherein the wireless communication system is configured to:
transmit a message confirming playback of the received electronic communication.

3. The portable interactive toy of claim 1, wherein the plurality of media components is configured to:
record, for a predetermined period of time, a reaction of the user in response to playback of the received electronic communication.

4. The portable interactive toy of claim 3, wherein the wireless communication system is configured to:
transmit the recording of the user's reaction to a remote device.

5. The portable interactive toy of claim 1, wherein the plurality of media components comprises an audio component coupled with the body and in communication with the data processing system, the audio component operable to vocalize messages received by the wireless communication system.

6. The portable interactive toy of claim 5, wherein the audio component is configured to vocalize a first message in a first voice and a second message in a second voice different from the first voice.

7. The portable interactive toy of claim 5, wherein the audio component is configured to vocalize a first message in a first language and a second message in a second language different from the first language.

8. The portable interactive toy of claim 1, wherein determining that the electronic communication is deliverable comprises determining that the electronic communication is from an authorized party, and determining that the electronic communication is undeliverable comprises determining that the electronic communication is from an unauthorized party.

9. The portable interactive toy of claim 1, wherein the first set of operations comprises:
providing an indication to the user that the deliverable electronic communication has been received.

10. The portable interactive toy of claim 1, wherein the first set of operations comprises:
determining that the electronic communication includes a blacklisted word; and
filtering out the blacklisted word during playback of the electronic communication.

11. The portable interactive toy of claim 1, wherein the second set of operations comprises:
preventing delivery of the electronic communication to the user.

12. The portable interactive toy of claim 1, wherein the wireless communication system is configured to communicate via Wi-Fi, Bluetooth, near-field, or cellular technology.

13. A portable interactive toy, comprising:
a body;
a data processing system coupled with the body, the data processing system configured to operate the toy and determine when a new message is present;
memory coupled with the body and in communication with the data processing system, wherein the memory includes one or more programmable calendars;
a wireless communication system coupled with the body and in communication with the data processing system;
a plurality of media components coupled with the body and in communication with the data processing system, the media components configured to deliver media content received by the toy and voice messages associated with the one or more programmable calendars, the plurality of media components comprising an audio component configured to vocalize the new message in one of multiple pre-configured voices; and
a power supply configured to supply electrical power to one or more components of the toy.

14. The portable interactive toy of claim 13, wherein the plurality of media components comprises a media component configured to:
provide, for a duration of time, an indication that the new message is present;
deactivate, after the duration of time, based at least in part on a determination that a specified action has not occurred; and
reactivate when the toy is touched.

15. The portable interactive toy of claim 13, wherein the power supply comprises at least one of a solar panel, a rechargeable or replaceable battery, and a motion-driven recharge component.

16. The portable interactive toy of claim 13, wherein the media content comprises one or more books, music, applications, games, calendar-based content, and is downloadable either through a web-based portal or a mobile phone application.

17. The portable interactive toy of claim 13, wherein the plurality of media components comprises at least one of the audio component, a video component, an accelerometer, or a visual alert component.

18. The portable interactive toy of claim 13, wherein the plurality of media components comprises an audio indicator operable to emit an audio signal or a visual indicator operable to emit light when media content is present at the toy.

19. The portable interactive toy of claim 13, further comprising a component operable to provide mechanical animation when media content is present at the toy.

* * * * *